United States Patent [19]
Walker et al.

[11] Patent Number: 5,154,060
[45] Date of Patent: Oct. 13, 1992

[54] STIFFENED DOUBLE DOME COMBUSTOR

[75] Inventors: Alan Walker, Wyoming; David W. Parry, Cincinnati, both of Ohio; Stanley K. Widener, San Antonio, Tex.

[73] Assignee: General Electric Company, Cincinnati, Ohio

[21] Appl. No.: 743,942

[22] Filed: Aug. 12, 1991

[51] Int. Cl.⁵ .......................... F23R 3/60; F02C 3/14
[52] U.S. Cl. .......................................... 60/746; 60/752
[58] Field of Search ............... 60/34.31, 39.32, 748, 60/746, 747, 752; 239/406

[56] References Cited
U.S. PATENT DOCUMENTS

| 2,780,062 | 2/1957 | Barrett et al. | 60/747 |
| 2,813,397 | 11/1957 | Fisher et al. | 60/39.32 |
| 2,852,914 | 9/1958 | Robin et al. | 60/39.31 |
| 3,273,343 | 9/1966 | Cretella | 60/39.72 |
| 3,589,127 | 6/1971 | Kenworthy et al. | 60/39.37 |
| 3,653,207 | 4/1972 | Stenger et al. | 60/746 |
| 4,194,358 | 3/1980 | Stenger | 60/39.06 |
| 4,195,475 | 4/1980 | Verdouw | 60/746 |
| 4,365,477 | 12/1982 | Pearce | 60/737 |
| 4,471,623 | 9/1984 | Griffin | 60/752 |
| 4,525,996 | 7/1985 | Wright et al. | 60/39.31 |
| 4,763,482 | 8/1988 | Wehner | 60/746 |
| 4,903,492 | 2/1990 | King | 60/733 |

OTHER PUBLICATIONS

Burrus et al., "Energy Efficient Engine, Combustion System Component Development Report," NASA Report R82AEB401, Nov. 1982, pp. cover, title, 1–3, 7, 16, 47–50, and 81–87.

Primary Examiner—Richard A. Bertsch
Assistant Examiner—Timothy S. Thorpe
Attorney, Agent, or Firm—Jerome C. Squillaro; James P. Davidson

[57] ABSTRACT

A double dome combustor for a gas turbine engine includes first and second domes joined to outer and inner liners. Two radially spaced apart rows of air swirlers are fixedly mounted to the first and second domes, respectively, with each of the swirlers including a radially extending strut, with pairs of struts being fixedly joined together for providing rigidity of the first and second domes for accommodating pressure loading thereon.

13 Claims, 7 Drawing Sheets

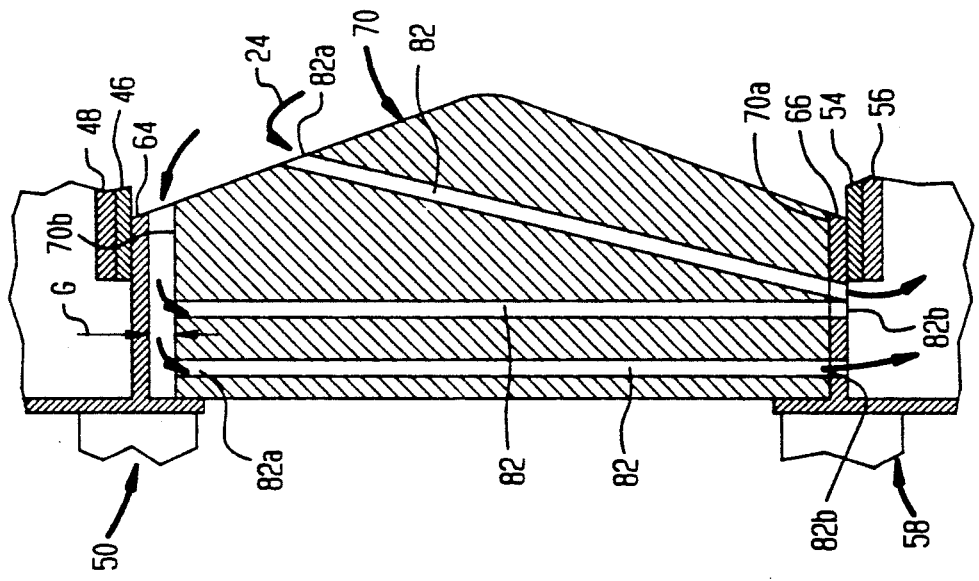

STIFFENED DOUBLE DOME COMBUSTOR

The U.S. Government has rights in this invention in accordance with Contract No. F33657-83C-0281 awarded by the Department of the Air Force.

TECHNICAL FIELD

The present invention relates generally to gas turbine engine combustors, and, more specifically, to a double dome combustor.

BACKGROUND ART

Combustors used in gas turbine engines, for example those engines used for powering aircraft, typically include sheet metal combustion liners and sheet metal combustion dome assemblies. The combustor is provided with pressurized, compressed airflow from the gas turbine engine compressor and is, therefore, subject to pressure loading from the compressed airflow which will deform and buckle the combustor unless suitable stiffening structural support is provided to the combustor.

Furthermore, the compressor includes circumferentially spaced rotor blades which provide the compressed airflow with pressure pulses. Accordingly, the combustor must also be configured for accommodating these pressure pulses for providing acceptable vibratory life.

A typical gas turbine engine combustor includes a single annular dome having a plurality of circumferentially spaced carburetors which provide a fuel/air mixture into the combustor. Each of the carburetors includes a conventional fuel injector for providing fuel, and a conventional typically counterrotational swirler which provides swirled air for mixing with the fuel. Such single dome combustors have a relatively high length-to-height ratio for obtaining, for example, acceptable mixing of the combustor gases for generally uniform combustor exit temperatures. In order to reduce the length-to-height ratio for reducing weight and exhaust emissions, including for example $NO_x$ emissions, double dome annular combustors are being considered.

A double dome annular combustor includes radially outer and inner domes each including a respective plurality of circumferentially spaced carburetors. Each of the domes has a respective combustion zone extending downstream therefrom, each having a respective length-to-height ratio which is generally equal to length-to-height ratios of conventional single dome combustors. However, the overall length of the double dome combustor may be made substantially smaller than the length of a single dome combustor since the two combustion zones operate in parallel.

Since a double dome combustor has two radially extending domes which typically have an increased surface area the domes are subject to relatively high pressure loading from the pressurized compressed airflow provided from the compressor. For example, in one design application, the resultant axial pressure loading acting upon the double domes of an exemplary combustor is on the order of 15,000 pounds (about 6,800 kilograms) which is a substantial amount of loading which must be accommodated by the combustor without unacceptable distortion, buckling, or high cycle fatigue (HCF) life.

In one exemplary double dome combustor, an annular centerbody is bolted to the dome between the outer and inner rows of carburetors for providing additional structural stiffness for the double dome. Futhermore, for providing yet additional structural stiffness for accommodating the high pressure loading on the double dome, it is known to provide a plurality of circumferentially spaced, radially extending stiffening struts between the outer and inner domes which support the dome end of the combustor to liner supports. However, the centerbody and struts add complexity, weight, and cost to the combustor design.

OBJECTS OF THE INVENTION

Accordingly, one object of the present invention is to provide a new and improved combustor for a gas turbine engine.

Another object of the present invention is to provide a new and improved double dome combustor having increased dome rigidity for accommodating pressure loading from compressed airflow.

Another object of the present invention is to provide a double dome combustor having relatively few components.

Another object of the present invention is to provide a double dome combustor having improved high cycle fatigue life.

DISCLOSURE OF INVENTION

A double dome combustor for a gas turbine engine includes first and second domes joined to outer and inner liners. Two radially spaced apart rows of air swirlers are fixedly mounted to the first and second domes, respectively, with each of the swirlers including a radially extending strut, with pairs of struts being fixedly joined together for providing rigidity of the first and second domes for accommodating pressure loading thereon.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

FIG. 8 is a longitudinal sectional view of one of the struts and adjacent structure taken along line 8—8 of FIG. 6.

FIG. 9 is a longitudinal sectional view of a second one of the struts and adjacent structure as illustrated in FIG. 6 taken along line 9—9.

MODE(S) FOR CARRYING OUT THE INVENTION

Figure 1:
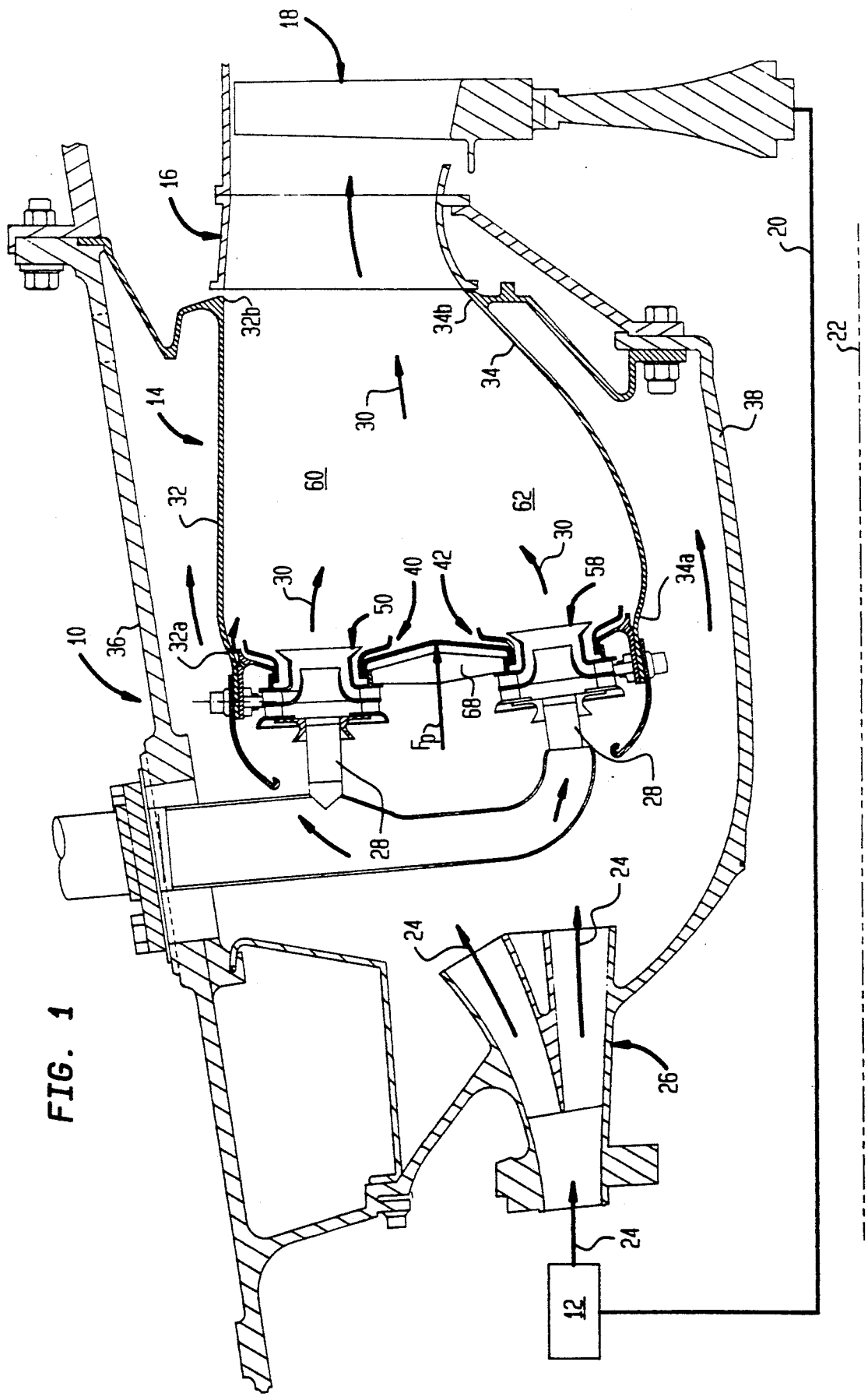
FIG. 1 is a longitudinal centerline schematic sectional view of a portion of a gas turbine engine including a combustor in accordance with one embodiment of the present invention.

Illustrated in FIG. 1 is a longitudinal sectional, partly schematic, view of a portion of an exemplary gas turbine engine 10. The engine 10 includes in serial flow communication a conventional high pressure compressor (HPC) 12, a combustor 14 in accordance with one embodiment of the present invention, a conventional high pressure turbine nozzle 16, and a conventional high pressure turbine (HPT) 18 is conventionally fixedly connected to the HPC 12 by an HP shaft 20. The engine 10 is symmetrical about a longitudinal centerline axis 22 disposed coaxially with the HP shaft 20.

During operation, ambient airflow is compressed by the HPC 12 and is provided as pressurized compressed airflow 24 to the combustor 14 through a conventional diffuser 26. Conventional fuel injectors 28 provide fuel to the combustor 14 which is mixed with the compressed airflow 24 and undergoes combustion in the combustor 14 for generating combustion discharge gases 30. The gases 30 flow in turn through the HP nozzle 16 and the HPT 18 wherein energy is extracted for rotating the HP shaft 20 for driving the HPC 12.

The combustor 14 includes annular outer and inner liners 32 and 34, respectively, each disposed coaxially about the centerline axis 22. Each of the liners 32 and 34 includes an upstream end 32a and 34a, respectively, and a downstream end 32b and 34b, respectively. The downstream ends 32b and 34b are conventionally fixedly connected to an outer casing 36 and an inner casing 38, respectively, by being clamped thereto using conventional bolts. By this arrangement, the combustor 14 is supported solely at the outer and inner liner downstream ends 32b and 34b with the upstream ends 32a and 34a being freely supported.

The combustor 14 in accordance with the present invention, includes a radially outer, annular, first, or pilot, dome 40, and a radially inner, annular, second, or main, dome 42 disposed generally radially inwardly of the first dome 40.

Figure 2:
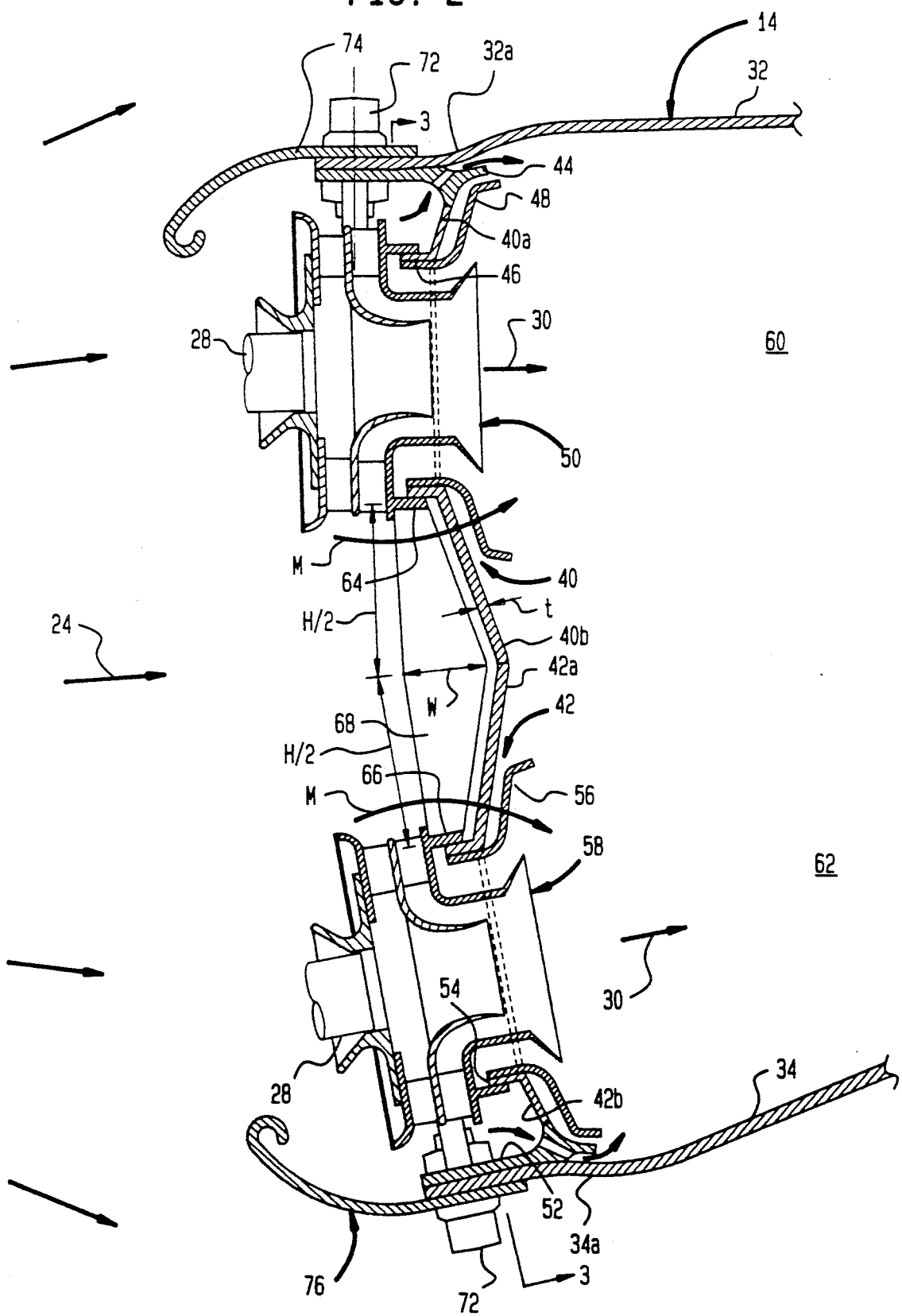
FIG. 2 is an enlarged longitudinal sectional view of the upstream, dome end of the combustor illustrated in FIG. 1 in accordance with a preferred embodiment of the present invention.

FIG. 2 illustrates in more particularity the upstream end of the combustor 14. The first dome 40 includes an annular radially outer end or edge 40a which is fixedly joined to the outer liner upstream end 32a by being fixedly joined, by welding for example, to a conventional, rigid cooling air outer nugget 44 fixedly bolted to the liner 32. The first dome 40 also includes an annular radially inner end or edge 40b which is spaced radially inwardly from the outer end 40a. A plurality of circumferentially spaced first tubular bosses 46 are disposed in the first dome 40 each receiving a conventional first annular baffle 48 fixedly joined thereto by brazing, for example.

Each of the first bosses 46 includes a conventional, but for the present invention, counterrotational dome cup, or swirler 50 fixedly joined thereto in flow communication therewith. Each first swirler 50 includes a respective one of the fuel injectors 28 conventionally slidably disposed therein.

The second dome 42 is spaced radially inwardly from the first dome 40 and includes an annular radially outer end or edge 42a, and an annular radially inner end or edge 42b spaced radially inwardly from the second dome outer end 42a. The second dome inner end 42b is conventionally fixedly joined to the inner liner upstream end 34a by being fixedly joined, by welding for example, to a conventional, rigid cooling air inner nugget 52 fixedly bolted to the liner 34. The second dome 42 also includes a plurality of circumferentially spaced second tubular bosses 54 disposed therein for receiving a conventional annular second baffle 56, which is fixedly secured therein by brazing, for example. A plurality of conventional, but for the present invention, counterrotational second dome cups, or swirlers 58 are fixedly joined to the second bosses 54 by being brazed thereto for example, in flow communication therewith. Each of the second swirlers 58 includes a respective one of the fuel injectors 28 slidably disposed therein.

The inner liner 34 is spaced radially inwardly from the outer liner 32 to define therebetween first and second combustion zones 60 and 62 extending downstream from the first and second domes 40 and 42, respectively.

In accordance with the present invention, means are provided for joining together the first dome 40 and the second dome 42 for providing axial, or longitudinal structural rigidity of the first and second domes 40 and 42 for accommodating pressure loading from the compressed airflow 24. As illustrated in FIG. 1, the compressed airflow 24 discharged from the diffuser 26 acts against the upstream surfaces of the first and second domes 40 and 42 creating a pressure loading indicated schematically by the resultant pressure force $F_p$. In one design application of the combustor 14, the pressure force $F_p$ acting on the first and second domes 40 and 42 is about 15,000 pounds (6,800 kg). This is a substantial amount of pressure force which must be accommodated by the combustor 14, and in particular the first and second domes 40 and 42, without unacceptable bending deformation, buckling, or HCF life. In the exemplary embodiment illustrated in FIG. 1, the combustor 14 is aft-mounted at the downstream ends 32b and 34b of the outer and inner liners, and, therefore, no support is provided at the forward end of the combustor 14 which could be used in this embodiment for partly accommodating the pressure loads $F_p$.

Furthermore, the first and second domes 40, 42 preferably comprise a single piece metal sheet, i.e. sheet metal, which is relatively thin having a thickness t as shown in FIG. 2 of about 50 mils (1.27 mm) which has a substantial advantage in reduced weight and cost as compared to a conventional double annular dome having an annular centerbody or stiffening struts. In contrast, individual radially aligned pairs of the first and second swirlers 50, 58 are fixedly joined together for providing rigidity of the first and second domes 40, 42 for accommodating the pressure loading from the compressed airflow 24 thereon.

Figure 3:
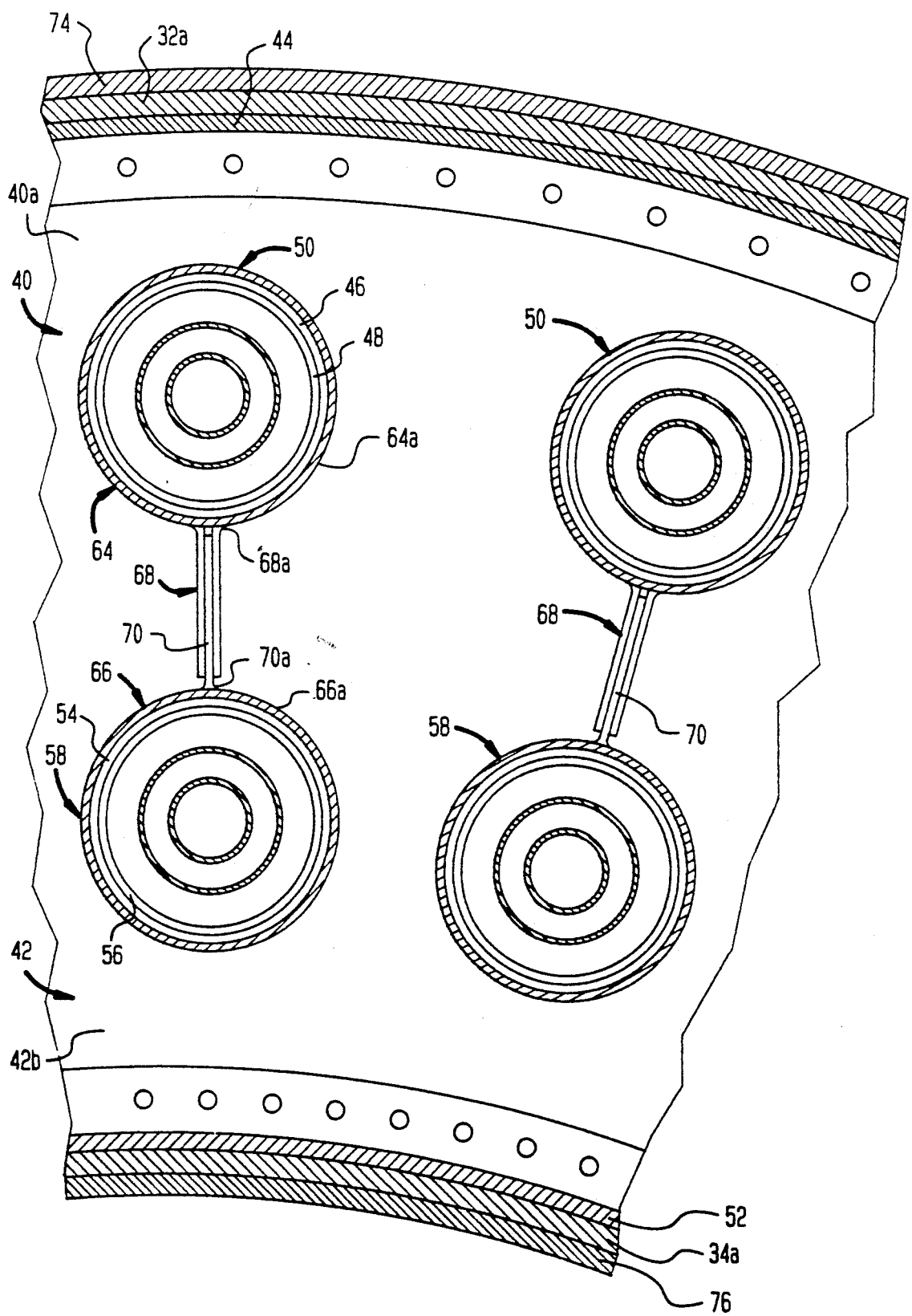
FIG. 3 is a transverse, partly sectional view of a portion of the combustor illustrated in FIG. 2 facing in a downstream direction and taken along line 3—3, including two circumferentially adjacent radially spaced pairs of air swirlers joined by struts.
Figure 4:
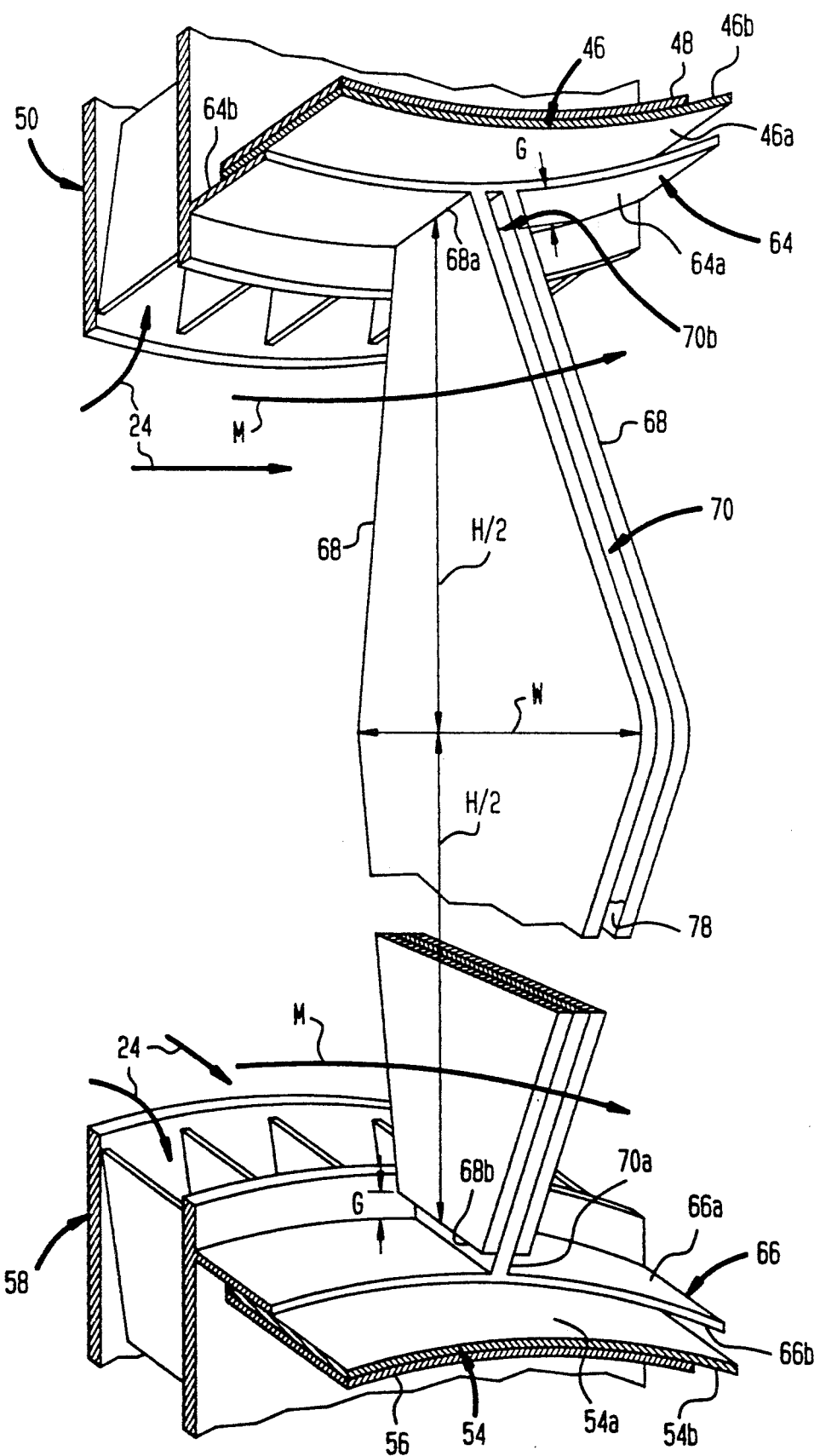
FIG. 4 is a perspective view, partly in section, of one set of the struts and portions of the outer and inner swirlers joined thereto illustrated in FIG. 3.
Figure 5:
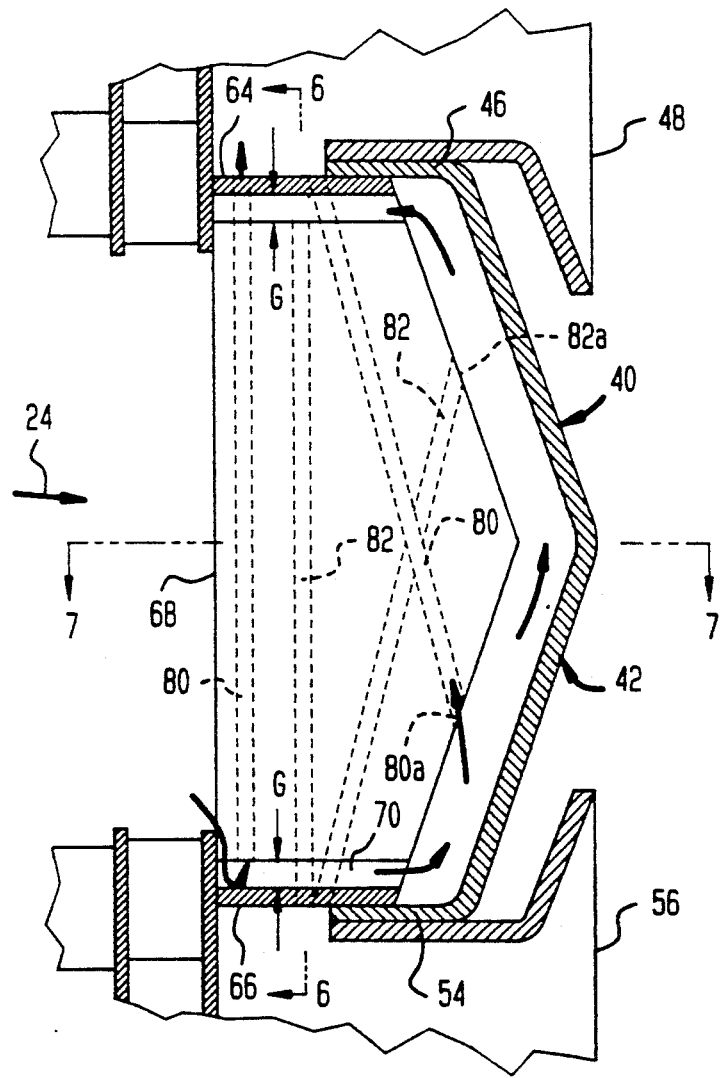
FIG. 5 is an enlarged, longitudinal, partly sectional view of the struts and adjacent structure of the combustor in accordance with a second embodiment of the present invention.

More specifically, and referring to FIGS. 2 and 3, each of the first and second swirlers 50, 58 includes an integral tubular mounting flange 64, 66 extending toward and over the first and second bosses 46, 54, respectively, and fixedly joined thereto. Referring to FIG. 4, each of the mounting flanges 64, 66 has a radially outer perimeter or surface 64a, 66a, respectively, and a radially inner perimeter or surface 64b, 66b, respectively. Similarly, each of the first and second bosses 46, 54, has a radially outer surface 46a, 54a, respectively, and a radially inner surface 46b, 54b, respectively. The first and second baffles 48, 56 are fixedly mounted to the boss inner surfaces 46b, 54b by brazing for example.

In accordance with one embodiment of the present invention, the flange inner surfaces 64b, 66b are preferably fixedly mounted to the boss outer surfaces 46a, 54a, respectively, by brazing for example. And, each of the first swirlers 50 includes a radially inwardly extending first strut 68 having a proximal end 68a fixedly joined to the outer surface 64a of the first mounting flange 64. Similarly, each of the second swirlers 58 includes a radially outwardly extending second strut 70 having a proximal end 70a fixedly joined to the outer surface 66a of the second mounting flange 66. The mounting flange inner surfaces 64b, 66b are preferably fixedly joined to the outer surfaces 46a, 54a, respectively of the first and second bosses 46, 54 so that the first and second struts 68, 70 do not separate or cut through either of the respective first and second bosses 46, 54 of the first and second domes 40, 42. In this way, the first and second domes 40, 42 may be formed from a single piece of sheet metal, with the first and second bosses 46, 54 being conventionally formed therethrough, and the first and second swirlers 50, 58 being mounted by the flanges 64, 66 on the outer surfaces 64a, 66a thereof. The baffles 48, 56 may then be mounted on the inner surfaces 46b, 54b of the bosses 46, 54.

The first and second struts 68, 70 as shown in FIG. 4, for example, overlap each other in the longitudinal plane (along the longitudinal axis 22 shown in FIG. 1) and are preferably substantially coextensive in configuration. Referring to both FIGS. 2 and 4, each of the struts 68, 70 has a distal end 68b, 70b, respectively which is disposed closely adjacent to the proximal end 70a, 68a of the opposing strut, respectively. The distal ends 68b, 70b, are spaced radially from the flange outer surfaces 66a, 64a, respectively for creating small longitudinally extending radial gaps G therebetween for providing a small clearance for assembly purposes and for providing a path for the airflow 24 as described in more detail below.

The struts 68, 70 therefore extend radially between the first and second swirlers 50, 58 with substantially equal radial height H, and each has a maximum width W in the longitudinal plane disposed equidistantly between the flange outer surfaces 64a, and 66a at or near a radial center of the height H, i.e., at about H/2 for providing a maximum moment of inertia for accommodating bending moment due to the pressure loading on the first and second domes 40, 42.

More specifically, as shown in FIG. 2 the compressed airflow 24 acting on the first and second domes 40, 42 tends to buckle the domes 40, 42 inwardly, or to the right as shown in FIG. 2, toward the combustion zones 60, 62. Resultant bending moments M are created by the compressed airflow 24 acting on the domes 40, 42 which tend to rotate the first swirlers 50 in a counterclockwise direction, and the second swirlers 58 in a clockwise direction as shown in FIG. 2. The struts 68, 70, however are fixedly joined together, by brazing for example, and to the respective first and second swirlers 50, 58 and therefore provide a structurally rigid assembly for providing rigidity of the first and second domes 40, 42, joined thereto, for accommodating the pressure loading from the compressed airflow 24. Since the bending moment M has a maximum effect generally equidistantly between the first and second bosses 46, 54, it is preferred that the first and second struts 68, 70 have their maximum width W at that same location for reducing the internal bending stresses therein.

In the preferred embodiment of the present invention, the first and second domes 40, 42 are each frustoconical in longitudinal section, or diverge in the downstream direction, for increasing the structural rigidity thereof as shown in FIG. 2 for example. The domes 40, 42 therefore have a generally W-shaped configuration with the first and second bosses 46, 54 being disposed at the outer peaks thereof, and the junction of the first dome inner end 40b and the second dome outer end 42a being disposed at the center peak thereof. The struts 68, 70 are preferably complementary in configuration to the domes 40, 42 between the bosses 46, 54 for maximizing the width W at the center thereof for maximizing rigidity of the assembly. The pressure loading on the domes 40, 42 is carried to the bosses 46, 54 which are rigidly interconnected by the swirlers 50, 58 brazed thereto, which are in turn interconnected by the struts 68, 70.

Accordingly, the swirlers 50, 58 with the struts 68, 70, are substantially rigid and extend for substantially the entire radial extent of the domes 40, 42. In this way, the center of the domes 40, 42 is prevented from undesirably bending or buckling due to the compressed airflow 24 acting thereagainst. The resulting reaction forces are channeled through the dome ends 40a, 42b to the outer and inner liners 32, 34, respectively and in turn to the outer casing 36 and the inner casing 38 (see FIG. 1). The outer and inner nuggets 44, 52 are preferably rigid components which may be conventionally machined from cast or forged rings for providing a structurally rigid interconnection between the domes 40, 42 and the outer and inner liners 32, 34. The outer and inner nuggets 44, 52 are conventionally joined to the liners 32, 34 by conventional bolts 72 for example, which also join thereto conventional outer and inner cowls 74, 76 respectively.

The first dome outer end 40a and the second dome inner end 42b are preferably conventionally welded to the outer and inner nuggets 44, 52, respectively. In an alternate embodiment of the present invention, the outer and inner nuggets 44, 52 could be formed integrally with the outer and inner domes 40, 42 and be part of the single sheetmetal structure. The mounting flanges 64, 66 and the baffles 48, 56, are preferably conventionally brazed to the bosses 46, 54. And, the struts 68, 70 are preferably brazed to each other for providing a rigid interconnection therebetween.

In a preferred embodiment of the present invention, the first and second struts 68, 70 have a tongue-and-groove configuration for increasing the surface area therebetween and, therefore, the amount of braze material effective for carrying shear loads therebetween. For example, and as shown in FIG. 4, the first strut 68 preferably includes a radial groove 78 which extends from the distal end 68b to the proximal end 68a. The second strut 70 (i.e. tongue 70) is disposed in the groove 78 and fixedly joined thereto by using conventional brazing. In this way, the second strut 70 may be brazed on both of its sides to two sides of the first strut 68 formed by the groove 78 which increases the total braze area and, therefore, reduces shear stresses which result from carrying forces between the first and second swirlers 50, 58 resulting from the compressed airflow 24.

Referring again to FIG. 2, it will be appreciated that as fuel from the injectors 28 is conventionally mixed with a portion of the compressed airflow 24 channeled through the swirlers 50, 58 resulting in the formation of the combustion gases 30 therefrom, those conbustion gases will cause the domes 40, 42 to heat faster than the struts 68, 70 which are shielded therefrom by the domes 40, 42. Accordingly, the domes 40, 42 will expand radially outwardly at a faster rate than that of the struts 68, 70. Since the struts 68, 70 are fixedly joined together and to the first and second swirlers 50, 58, the swirlers 50, 58 will restrain thermal growth of the domes 40, 42 resulting in thermally induced stress therein.

In order to reduce such thermally induced stresses in the domes 40, 42, means are provided for increasing the thermal response of the first and second struts 68, 70 as shown in more particularity in FIGS. 5-9. Each of the struts 68, 70 preferably includes a plurality of generally radially extending apertures 80, 82, respectively, for channeling a portion of the compressed airflow 24 therethrough for increasing thermal response of the struts 68, 70. The compressed airflow 24 is relatively hot due to the compression thereof in the compressor 12, and by channeling a portion thereof through the struts 68, 70 increased thermal response, or growth thereof, may be obtained for reducing the thermally induced stresses on the domes 40, 42 due to the radial restraint of the swirlers 50, 58 joined together by the struts 68, 70.

Figure 6:
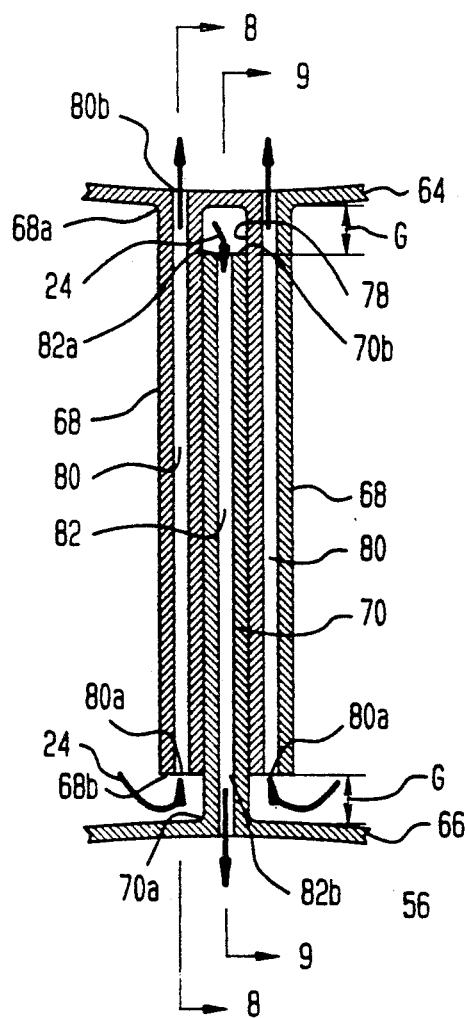
FIG. 6 is an upstream facing, transverse sectional view of a portion of the second embodiment of the present invention illustrated in FIG. 5 taken along line 6—6.
Figure 7:
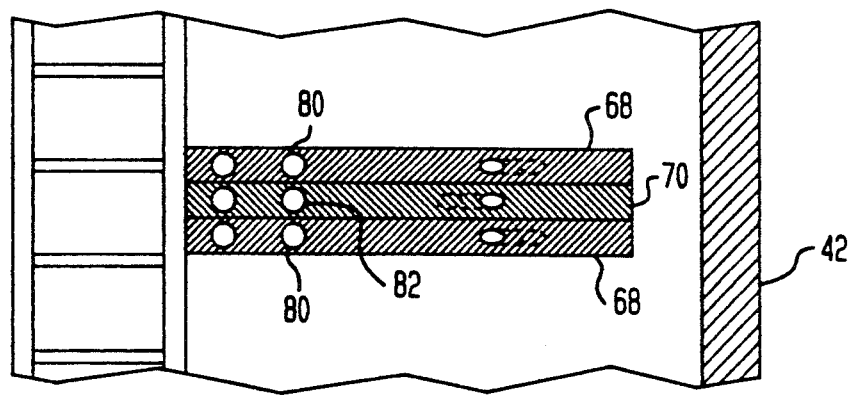
FIG. 7 is a radial, partly sectional view of a portion of the combustor illustrated in FIG. 5 taken along line 7—7.

Referring to FIG. 6, each of the apertures 80, 82 includes a respective inlet 80a, 82a at the respective distal ends 68b, 70b thereof which are disposed in flow communication with an upstream side of the domes 40, 42. More specifically, a portion of the airflow 24 flows between circumferentially adjacent ones of the first struts 68 from an upstream direction toward the upstream side of the domes 40, 42. The airflow 24 then flows into the gaps G between the strut distal ends 68b, 70b and the respective flange outer surfaces 66a, 64a. The airflow 24 then flows through the inlets 80a, 82a and through the struts 68, 70, and is discharged through respective outlets 80b, 82b disposed through the struts proximal ends 68a, 70a in flow communication with a downstream side of the domes 40, 42 for allowing the pressure drop across the domes 40, 42 to cause the airflow 24 to flow through the apertures 80, 82 and into the combustion zones 60, 62 (see FIG. 2).

Illustrated in FIG. 8 are the first apertures 80 extending through one side of the first struts 68, with the second side of the strut 68 being identical thereto. Three apertures 80 are illustrated, although fewer or more apertures 80 may be used as desired, with each aperture 80 being in the form of a simple drilled hole extending generally radially through the first strut 68. The respective inlets 80a are disposed along the radially inner edges of the first strut 68, for example in the distal end 68b as well as along the bottom, front surface of the first strut 68. The outlets 80b extend through the mounting flange 64 directly into the first swirler 50 for being disposed in flow communication with the downstream side of the first dome 40.

Similarly, and referring to FIG. 9, the second apertures 82 extend radially through the second strut 70 from the radially outer edges thereof including the distal end 70b and the top forward surface thereof. The second apertures 82 are also preferably simply drilled holes extending therethrough, with the inlets 82a being disposed in flow communication with the upstream side of the domes 40, 42, for example with the gap G of the channel 78. The outlets 82b are disposed in flow communication with the downstream side of the domes 40, 42 for causing the airflow 24 to flow through the apertures 80 and into the combustion zones 60, 62 (shown in FIG. 2). The outlets 82b extend through the second mounting flange 66 directly in flow communication with the second swirler 58.

The stiffening struts 68, 70 are preferably integrally cast to the respective, otherwise conventional swirlers 50, 58 during manufacture and, therefore, no additional components are required. Casting of the struts 68, 70 allows the use of a variety of conventional high strength materials which are not available from conventional sheet metal wrought alloys typically used in combustor dome construction. The swirlers 50, 56 may be readily assembled over the respective bosses 46, 54 while inserting the second strut 70 into the groove 78 of the first strut 68, and then the struts 68, 70 may be conventionally brazed together, and the mounting flanges 64, 66 being conventionally brazed to the respective bosses 46, 54. Since the flanges 64, 66 are mounted outside the bosses 46, 54, the first and second struts 68, 70 may be directly joined together without requiring a cut or separation through the domes 40, 42 which would otherwise be required if the flanges 64, 66 were mounted inside the bosses 46, 54. Thusly, each of the first and second swirler pairs 50, 58 with the joined together first and second struts 68, 70 provides a rigid, load carrying path across substantially the entire radial extent of the domes 40, 42 between the outer and inner liners 32, 34 for stiffening the domes 40, 42 and accommodating the large pressure loading acting on the domes 40, 42 from the compressed airflow 24. Accordingly, the domes 40, 42 themselves need not be configured for providing structural rigidity effective alone for accommodating the compressed airflow 24, but instead may be a simply manufactured sheet metal component resulting in a simpler and less expensive combustor 14.

The overlapping tongue-and-groove configuration of respective first and second strut pairs 68, 70 results in a large braze joint area, thusly producing low shear stress therein, while accommodating the high bending moments M effected by the compressed airflow 24 on the domes 40, 42. The additional structural centerbody typically found in a conventional double dome combustor is, therefore, not required, nor, are additional stiffening struts required between the outer and inner liners 32, 34.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

We claim:

1. For a gas turbine engine having a compressor providing compressed airflow, an annular combustor disposed coaxially about a longitudinal centerline axis comprising:

an outer liner;

an inner liner spaced from said outer liner;

a first dome having an outer end fixedly joined to said outer liner, an inner end spaced from said outer end, and a plurality of circumferentially spaced first tubular bosses disposed therein;

a second dome spaced from said first dome and having an outer end, an inner end spaced from said second dome outer end and fixedly joined to said inner liner, and a plurality of circumferentially spaced second tubular bosses disposed therein;

said outer and inner liners defining therebetween first and second combustion zones disposed downstream of said first and second domes, respectively;

a plurality of first air swirlers fixedly joined to said first dome in flow communication with a respective dome first boss;

a plurality of second air swirlers fixedly joined to said second dome in flow communication with a respective dome second boss;

a radially inwardly extending first strut fixedly joined to a respective one of said first swirlers;

a radially outwardly extending second strut fixedly joined to a respective one of said second swirlers; and said first and second struts being fixedly joined to each other for providing rigidity of said first and second domes for accommodating pressure loading from said compressed airflow, wherein said first and second struts overlap each other in a longitudinal plane and extend between said first and second swirlers for a radial height.

2. A combustor according to claim 1 wherein said first and second struts are substantially coextensive in configuration and have a maximum width in said longitudinal plane disposed near a radial center of said height for providing a maximum moment of inertia for accommodating bending moment due to said pressure loading on said first and second domes.

3. A combustor according to claim 2 wherein;

said first and second domes comprise a single piece metal sheet having two radially spaced apart rows of said first and second tubular bosses disposed therein;

said first and second swirlers are fixedly joined to said first and second bosses, respectively; and said first and second struts are effective for carrying said pressure loading from said first and second domes to said outer and inner liners for preventing buckling of said first and second domes from said pressure loading.

4. A combustor according to claim 3 further including:

a rigid cooling air outer nugget fixedly joined to said outer liner;

a rigid cooling air inner nugget fixedly joined to said inner liner; and said first dome outer end and said second dome inner end being fixedly joined to said outer and inner liners, respectively, by being fixedly joined to said outer and inner nuggets, respectively.

5. A combustor according to claim 3 wherein said first and second domes are each frustoconical in longitudinal section for increasing rigidity thereof.

6. A combustor according to claim 3 wherein:

each of said first and second swirlers includes a tubular mounting flange extending toward said first and second bosses, respectively, having a radially outer surface and a radially inner surface;

said first and second struts are fixedly joined to said outer surfaces of said mounting flanges of said first and second swirlers, respectively; and said mounting flange inner surfaces of said first and second swirlers are fixedly joined to radially outer surfaces of said first and second bosses, respectively, so that said first and second struts do not separate either of said first and second bosses, respectively.

7. A combustor according to claim 3 wherein said first and second struts have a tongue-and-groove configuration fixedly joined together.

8. A combustor according to claim 7 wherein said first strut includes a radial groove therein, and said second strut is fixedly disposed in said radial groove.

9. A combustor according to claim 3 further including means for increasing thermal response of said first and second struts.

10. A combustor according to claim 9 wherein said thermal response increasing means comprise a plurality of apertures in said first and second struts for channeling a portion of said compressed airflow therethrough.

11. A combustor according to claim 10 wherein said apertures extend radially through each of said first and second struts and include inlets disposed in flow communication with an upstream side of said first and second domes, and outlets disposed in flow communication with a downstream side of said first and second domes for causing said compressed airflow to flow through said apertures and into said first and second combustion zones.

12. A combustor according to claim 11 wherein:

each of said first and second swirlers includes a tubular mounting flange extending toward said first and second bosses, respectively, having a radially outer surface and a radially inner surface;

said first and second struts are fixedly joined to said outer surfaces of said mounting flanges of said first and second swirlers, respectively; and said mounting flange inner surfaces of said first and second swirlers are fixedly joined to radially outer surfaces of said first and second bosses, respectively, so that said first and second struts do not separate either of said first and second bosses, respectively.

13. A combustor according to claim 12 wherein said strut aperture outlets extend through said mounting flanges.

* * * * *